(12) United States Patent
Tanaka et al.

(10) Patent No.: US 7,225,672 B2
(45) Date of Patent: Jun. 5, 2007

(54) LIQUID LEVEL SENSOR AND METHOD OF MANUFACTURING THE SAME

(75) Inventors: Kenichi Tanaka, Shimada (JP); Toshiaki Fukuhara, Shimada (JP); Yukio Takahashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/778,194

(22) Filed: Feb. 17, 2004

(65) Prior Publication Data

US 2004/0163467 A1    Aug. 26, 2004

(30) Foreign Application Priority Data

Feb. 20, 2003    (JP) ............................ P2003-043016

(51) Int. Cl.
*G01F 23/00* (2006.01)

(52) U.S. Cl. ........................................ 73/313

(58) Field of Classification Search .................. 73/313, 73/314, 319, 290 R; 324/207.25, 2, 207.2; 33/719

See application file for complete search history.

(56) References Cited

U.S. PATENT DOCUMENTS

2004/0003660 A1    1/2004    Fukuhara et al. ............. 73/319

FOREIGN PATENT DOCUMENTS

| DE | 197 51 210 A1 | | 5/1999 |
|---|---|---|---|
| DE | 101 42 618 A1 | | 3/2003 |
| JP | 2001201390 A | * | 7/2001 |
| JP | 2002-206945 A | | 7/2002 |
| JP | 2002-206959 A | | 7/2002 |
| JP | 2003004508 A | * | 1/2003 |
| JP | 2003004509 A | * | 1/2003 |
| JP | 2003004510 A | * | 1/2003 |

* cited by examiner

*Primary Examiner*—Hezron Williams
*Assistant Examiner*—Tamiko Bellamy
(74) *Attorney, Agent, or Firm*—Sughrue Mion, PLLC

(57) ABSTRACT

A liquid level sensor includes a housing, a rotary shaft which is rotatably provided in the housing, a magnet which is fixed to the rotary shaft, and rotating together with the rotary shaft, a pair of stators which are disposed so as to face an outer peripheral surface of the magnet, and an electronic circuit which includes at least a set of terminals and a magnetoelectric transducing element for detecting a change of magnetic flux in the stators caused by rotation of the magnet and for outputting an electric signal. The magnetoelectric transducing element and the stators are electrically connected and fixed to the set of terminals so that a terminal assembly is formed. The housing is formed by insert molding the terminal assembly with resin so that the terminal assembly is embedded in the housing.

7 Claims, 12 Drawing Sheets

US 7,225,672 B2

LIQUID LEVEL SENSOR AND METHOD OF MANUFACTURING THE SAME

BACKGROUND OF THE INVENTION

The present invention relates to a liquid level sensor and a method of manufacturing the same. More particularly, the invention relates to a non-contact type liquid level sensor which is improved in the vibration proof performance, and reduced in a sensor output variation caused by a change of an ambient environment temperature, whereby the liquid level sensor accurately detects a liquid level, and which is well adaptable for a vehicle fuel tank or the like, and a method of manufacturing the non-contact type liquid level sensor.

Recently, a liquid level sensor of the non-contact type, for example, is mounted on a fuel tank of a vehicle, such as an automobile, and detects an amount of fuel liquid contained in the fuel tank. In a related liquid level sensor, an annular magnet which rotates with movement of a float is disposed within a frame. A hall element as a magnetoelectric transducing element is disposed at the center of the magnet, while being flush with the annular magnet. The hall element detects a change of magnetic flux developed by the turning magnet, and converts it into an electric signal. The liquid level sensor thus constructed detects a liquid level of the fuel in the fuel tank by using the electric signal. For example, the related liquid level sensor is disclosed in JP-A-2002-206959 (pp. 4 to 5, FIG. 1).

A magnet holder to which the magnet is fixed is rotatably held with a holding member formed on a surface of the frame. A pair of cores are disposed facing the magnet. A hall element is located in a gap between the cores. The cores and the hall element are disposed within the frame. The liquid level sensor thus constructed detects a change of magnetic flux caused by the turning of the magnet is detected. For example, this configuration is disclosed in JP-A-2002-206945 (pp. 3 to 4, FIG. 1).

Non-contact type liquid level sensors disclosed in the above Patent Documents follow. The hall element and the magnet are disposed in the same plane (JP-A-2002-206959). The magnet holder is rotatably held with a holding member formed on the frame surface (JP-A-2002-206945). Those technical features bring about the reduction of the thickness of the non-contact type liquid level sensor and the cost to manufacture. Neither of those patent documents, however, discloses a technique to avoid such an unwanted situation that the electronic parts come in contact with fuel, such as gasoline, and the performances of the electronic parts are deteriorated, by liquid-tightly sealing electronic parts, such as the hall element.

To maintain the high performances of the non-contact type liquid level sensor for a long period of time, some improvement is needed for the liquid level sensor. To this end, recently, a method is employed in which the electronic parts are liquid tightly sealed by welding the cover to the housing by laser welding, vibration welding or the like.

This technical method will be described below. As shown in FIG. 14, in a related non-contact type liquid level sensor 1, a housing 2 made of synthetic resin is fixedly disposed in a vehicle fuel tank 3. A fuel pump 19 is disposed within the vehicle fuel tank 3. A filter 7 is located at a suction port of the fuel pump 19. The filter filters out foreign materials contained in fuel 17. The filtered fuel is supplied to an engine or the like.

A rotary shaft 4 is rotatably disposed in a magnet containing portion 2a formed in the housing 2. A sintered magnet 5 is fit onto the outer peripheral surface of the rotary shaft 4. The sintered magnet 5 is fastened to the rotary shaft 4 by suitable means, such as bonding or engaging. The magnet 5 may be a ferrite magnet as formed by molding magnetic powder into an annular body, and radially magnetizing the resultant to have two magnetic poles.

A cover 14 made of synthetic resin is fixed to an opening part of the magnet containing portion 2a. A first end of the rotary shaft 4 is inserted into a support hole 14a formed in the cover 14, and rotatably supported thereby.

A first end of a float arm 6 is fixed to a float 8, and a second end thereof is fit into the hole of the rotary shaft 4 and fixed thereby. The float 8 vertically moves with a change of liquid level 15 of fuel in the vehicle fuel tank 3. At this time, the vertical movement is transmitted through the float arm 6 to the rotary shaft 4, which in turn rotates.

A couple of semicircular stators 9 are disposed facing an outer peripheral surface of the sintered magnet 5, while being combined into a circular configuration. The stators 9 are fixed to the housing 2 by suitable fixing member. Example of the fixing member is to insert mold the stators into the housing, to bond the stators to the housing, and to fit pins that are one-piece molded to the housing 2, into the positioning holes formed in the stators 9 and to fasten the pins by heat caulking.

A gap is present between the first ends of the coupled stators 9, and another gap is present between the second ends of the same. A phase difference of 180° is present between those gaps. A magnetoelectric transducing element 11, such as a hall element or a hall IC, is placed in one of the gaps, while being put between the couple of stators. Terminals 11a of the magnetoelectric transducing element 11 are electrically connected to a terminal 13.

When the float 8 vertically moves with a change of liquid level 15 of fuel in the vehicle fuel tank, the rotary shaft 4 rotates together with the sintered magnet 5. With rotation of the sintered magnet 5, a magnetic flux passing through the magnetoelectric transducing element 11 changes. The magnetoelectric transducing element 11 detects a change of the magnetic flux and coverts it into an electrical signal, and outputs it to the terminal 13.

As shown in FIG. 14, the terminal 13 transmits an electrical signal derived from the magnetoelectric transducing element 11 to the outside of the non-contact type liquid level sensor 1. The terminal is a plate like member which is made of conductive metal and longitudinally elongated, and a first end 13a of which is bent at a right angle to be L shaped. The terminal 13 is disposed such that it passes from the inside of a wall 2b of the housing 2 to the outside thereof, and its mid part is embedded in the wall 2b.

A plurality of grooves 13b are formed in a surface of the mid part of the terminal 13. To embed the mid part of the terminal 13 in the wall 2b of the housing 2, the mid part of the terminal including the grooves 13b is coated with a seal coating material 18, and then the terminal 13 is insert molded into the housing 2. As a result, the seal coating material 18 is brought into close contact with the wall 2b of the housing 2, thereby securing a seal between the terminal 13 and the housing 2.

A sensor chamber 2c is liquid tightly sealed in a manner that a cover 35 made of synthetic resin is welded thereto by laser welding or the like. A plurality of terminals 13 are disposed within the sensor chamber. Electronic parts, such as the magnetoelectric transducing element 11, resistors, capacitors, both not shown, are soldered to the first ends 13a of those terminals 13. Those electronic parts are electrically arranged to form a part of the detecting circuit. Soldering portions of the magnetoelectric transducing element 11, resistors, capacitors and the like are coated with potting agent 10 after those are soldered. The coating lessens forces acting on the soldering portions which are caused by vibrations generated when the vehicle runs, thereby protecting the soldering portions against the vibrations.

As described above, the related sealing method liquid tightly seals the sensor chamber 2c by welding the cover 35 to the housing 2 by laser welding, vibration welding or the like. The sealing of the sensor chamber sealed by the related sealing method is damaged by dimensional variation and deformation of the housing 2, the cover 35 or partial poor welding. As a result, such fuel as gasoline enters the sensor chamber 2c to possibly degrade the performances of the electronic parts, such as the magnetoelectric transducing element 11, resistors and capacitors.

A laser welding machine used for welding the cover 35 to the housing 2 is expensive, and large facility investment is needed. In this respect, use of such a sealing technique has economical problems to be solved.

Further, the work to apply the potting agent to the soldering portion, and the work to apply the seal coating material to the terminal 13 before the insert molding process are inevitably manual, and troublesome. In this respective, the productivity in manufacturing the sensors is inferior.

When the housing 2 is thermally expanded or shrank, the stators 9 fixed to the housing 2 by the insert molding, bonding, or heat caulking of the pins, as shown in FIGS. 15A, 15B and 15C, are possibly angularly moved in a direction in which a radius curvature of the inner periphery of the combined stators 9 increases (direction of an arrow A) or decreases (direction of an arrow B) (see FIG. 15A), in a direction (direction of an arrow C, see FIG. 15B) in which the stators 9 separate from the sintered magnet 5, in a direction (direction of an arrow D, see FIG. 15C) in which the couple of stators 9 separate from each other, and in other directions. If the gap G between the couple of stators 9 and the gap between the stators 9 and the sintered magnet 5 are changed by the angular movement of the stators 9, then an output signal level of the magnetoelectric transducing element 11 changes to thereby adversely affect a detection precision.

The stators 9 and the terminal 13 are fixed to different members; the former is fixed the housing 2, and the latter is fixed to the terminal 13. For this reason, relative positions of the stators 9 and the magnetoelectric transducing element 11 sometimes change in accordance with change of ambient environmental temperature in which the liquid level sensor is use, vibration and the like of the non-contact type liquid level sensor 1. Owing to this, a detect output signal of the magnetoelectric transducing element 11 sometimes changes.

SUMMARY OF THE INVENTION

It is therefore an object of the present invention to provide a non-contact type liquid level sensor which liquid tightly seals electronic parts having electric circuitries for a long term and stably, and restricts the displacement of the constituent parts in accordance with the ambient environmental temperature variation and the vibration to thereby keep a detection precision in high level and stably.

In order to achieve the above object, according to the present invention, there is provided a liquid level sensor comprising:

a housing;

a rotary shaft, rotatably provided in the housing;

a magnet, fixed to the rotary shaft, and rotating together with the rotary shaft;

a pair of stators, disposed so as to face an outer peripheral surface of the magnet; and an electronic circuit, including at least a set of terminals and a magnetoelectric transducing element for detecting a change of magnetic flux in the stators caused by rotation of the magnet and for outputting an electric signal, wherein the magnetoelectric transducing element and the stators are electrically connected and fixed to the set of terminals so that a terminal assembly is formed; and wherein the housing is formed by insert molding the terminal assembly with resin so that the terminal assembly is embedded in the housing.

Preferably, the magnet is contained in a magnet containing portion formed in the housing.

In the configurations, the magnetoelectric transducing element, the electronic parts, and the pair of stators are fixed to predetermined positions of the set of terminals to thereby form the terminal assembly, and the terminal assembly is insert molded into the housing, whereby the terminal assembly is embedded in the housing. The result is to reliably prevent seal leaking caused by poor welding of the cover, which is inevitable in the related cover, to protect the electric circuit for a long time, and hence, to maintain a high detection precision of the non-contact type liquid level sensor for a long term.

Also, the magnetoelectric transducing element, the electronic parts, the pair of stators, the terminals and others are fixedly embedded in the resin of the housing. Therefore, the vibration proof performance of the non-contact type liquid level sensor is remarkably improved. There is eliminated troublesome works, such as welding work of the cover and work of coating the soldered parts with a potting agent. The cost of manufacturing the non-contact type liquid level sensor is reduced. Further, there is eliminated the necessity of large facility investment for the laser welding machine and the vibration welding machine.

Preferably, the pair of stators and the magnetoelectric transducing element are fixed to one terminal of the set of terminals.

Thus, in the liquid level sensor, the pair of stators and the magnetoelectric transducing element are fixed to the same terminal. Therefore, the relative positions of the pair of stators and the magnetoelectric transducing element never change even when the use environmental temperature changes and the housing expands and shrinks, and vibration is applied to the liquid level sensor. Accordingly, the output signal of the liquid level sensor does not change, whereby a high detection precision is maintained.

Preferably, a sealing part of the terminal assembly is coated with a sealing agent. The sealing part is located near a connection portion of the terminal assembly which is exposed to exterior, and the sealing part is embedded in the housing.

In the configuration, after the sealing parts which are located near connection parts of the terminals and embedded in the housing are coated with a sealing agent, the terminal assembly is insert molded into the housing. A reliable sealing between the housing and the terminals is ensured. Therefore, the sealing performance is stably kept for a long time. Accordingly, there is eliminated the adverse influence of fuel or the like onto the electronic parts, and hence, a high detection precision of the liquid level sensor is maintained for a long time.

According to the present invention, there is also provided a method of manufacturing a liquid sensor, comprising the steps of:

providing a rotary shaft;

providing a magnet fixed to the rotary shaft, and rotating together with the rotary shaft;

providing a pair of stators, disposed so as to face an outer peripheral surface of the magnet;

providing an electronic circuit which includes at least a set of terminals and a magnetoelectric transducing element for detecting a change of magnetic flux in the stators caused by rotation of the magnet;

electrically connecting and fixing the magnetoelectric transducing element and the stators to the set of terminals so that a terminal assembly is formed; and forming a housing in which the terminal assembly is embedded by insert molding with resin.

Preferably, the magnet is contained in a magnet containing portion formed in the housing.

Preferably, the method further includes the step of coating a sealing part of the terminal assembly with a sealing agent before the forming step.

In the above methods, the magnetoelectric transducing element, the electronic parts, and the pair of stators are fixedly embedded in the housing. The magnetoelectric transducing element, the electronic parts and the pair of stators are never displaced by vibrations and the like caused when the vehicle runs. Accordingly, those parts and components are assembled at high accurate positions and easily. Accordingly, a liquid level sensor which is excellent in durability, and high in detection accuracy and reliability can be manufactured at low cost.

BRIEF DESCRIPTION OF THE DRAWINGS

The above objects and advantages of the present invention will become more apparent by describing in detail preferred exemplary embodiments thereof with reference to the accompanying drawings, wherein:

FIG. 5A is a longitudinal sectional view showing a case where no movable pins are used and the terminal is deformed by an injection pressure; FIG. 5B is a longitudinal sectional view showing a state that the terminal is clamped by movable pins in the insert molding process; and FIG. 5C is a longitudinal sectional view showing a state of a housing after the insert molding;

DETAILED DESCRIPTION OF THE PREFERRED EMBODIMENTS

A non-contact type liquid level sensor according to a first embodiment of the present invention will be described with reference to FIGS. 1 to 7.

Figure 1:
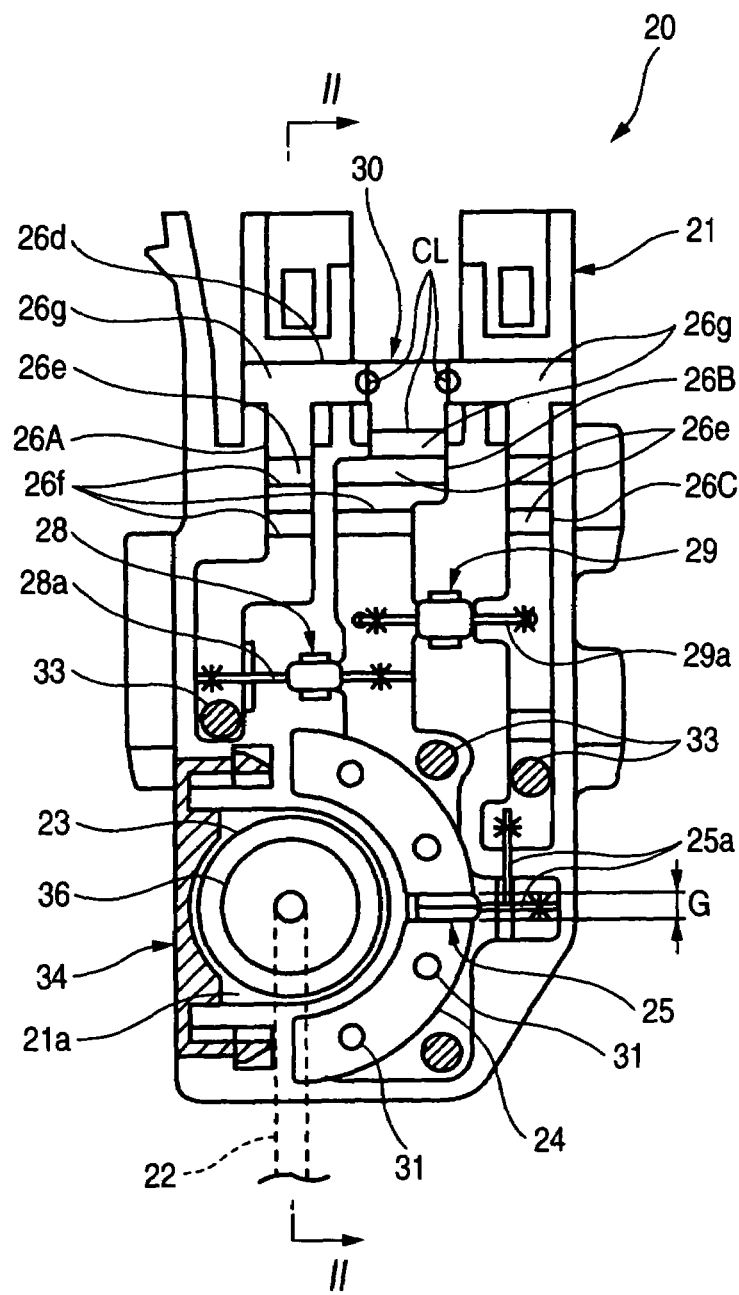
FIG. 1 is a plan view showing a non-contact type liquid level sensor according to a first embodiment of the invention.
Figure 2:
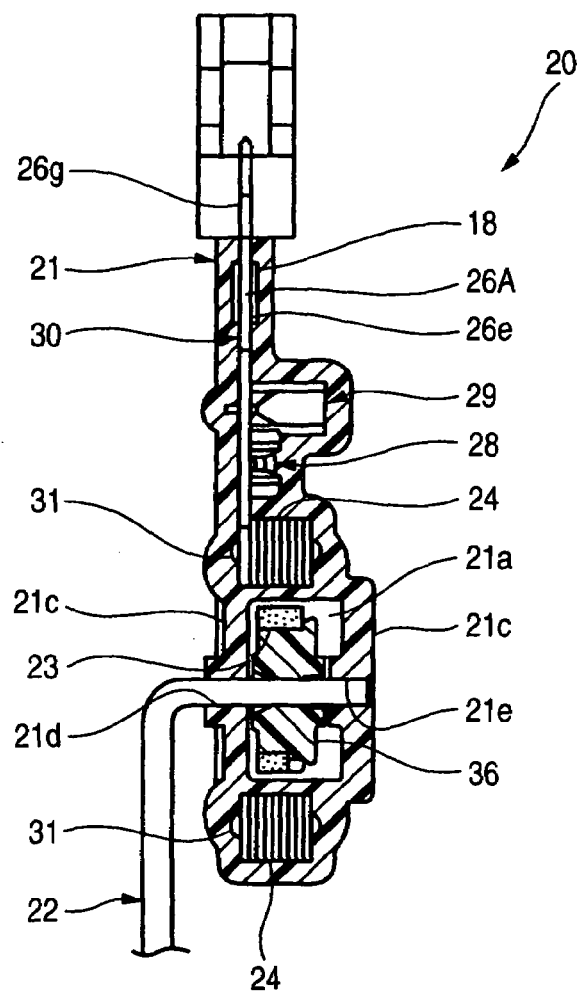
FIG. 2 is a cross sectional view taken on line II–II in FIG. 1.

As shown in FIGS. 1 and 2, in a non-contact type liquid level sensor 20 according to the first embodiment of the invention, a terminal assembly 30 is insert molded into the housing 21. Most part of the terminal assembly 30 except outer connection parts 26g is embedded in the synthetic resin of the housing 21.

Figure 3:
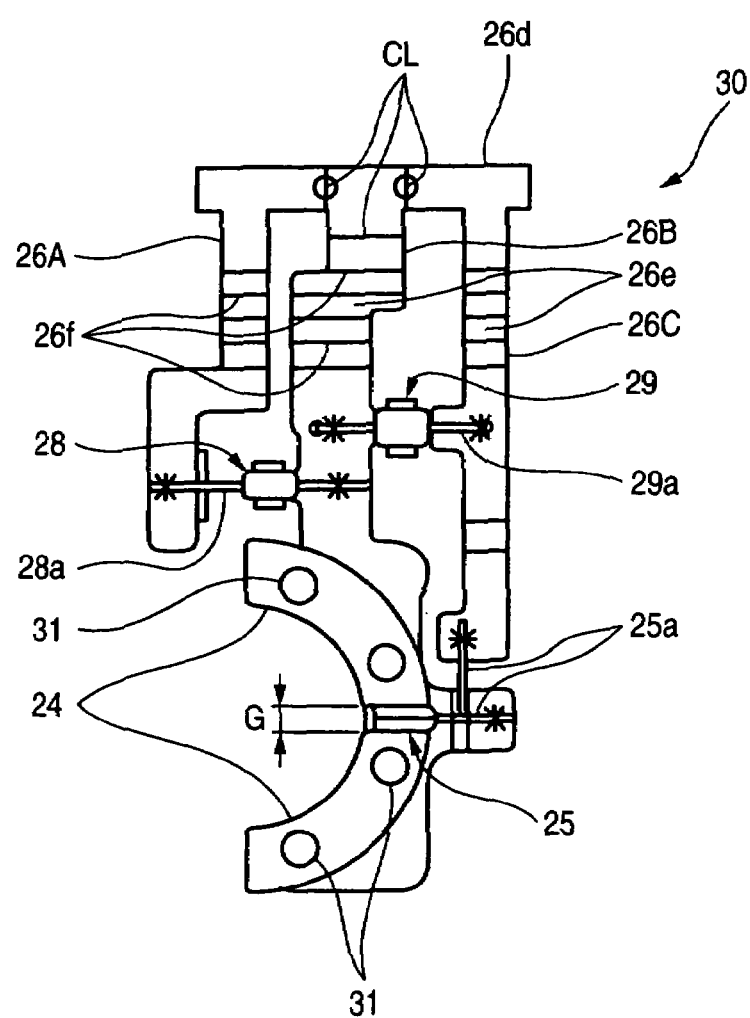
FIG. 3 is a plan view showing a terminal assembly in FIG. 1.

As shown in FIG. 3, the terminal assembly 30 includes an assembly of terminals 26A, 26B and 26C, a magnetoelectric transducing element 25, a resistor 28, a capacitor 29 and a couple of stators 24 which are assembled. The terminals 26A, 26B and 26C form a part of an electric circuit. Those terminals are provided for transferring an electric signal, which is detected by and output from the magnetoelectric transducing element 25, to exterior. Three different terminals 26A, 26B which are formed by pressing a conductive metal plate and have different shapes are handled as a set of terminals.

The upper ends of the terminals 26A, 26B and 26C are respectively connected to a strip like carrier 26d. After the terminals 26A, 26B and 26C are insert molded into the housing 21, the strip like carrier 26d is cut along a cut line CL. Then, the terminals 26A, 26B and 26C are separated and function as separate terminals. After the strip like carrier 26d is cut, the upper terminals of the terminals 26A, 26B and 26C serve as outer connection parts 26g.

The sealing parts 26e are located near the outer connection parts 26g of the terminals 26A, 26B and 26C and embedded in the housing 21 when those are insert molded thereinto. A plurality of V-grooves 26f are formed on those sealing parts in a direction perpendicular to the longitudinal direction of the terminals 26A, 26B and 26C. The insert molding of the terminal assembly 30 (terminals 26A, 26B and 26C) is carried out after the sealing parts 26e including the V-grooves 26f are coated with the seal coating material 18. With this process, a seal between the terminals 26A, 26B and 26C and the housing 21 is reliable.

A couple of stators 24 are each made of a magnetic plate shaped like a quadrant, and arranged in a longitudinal direction (vertical direction in FIG. 3) to take the form of a semicircular shape. Those stators are caulked and fixed to the terminal 26B by caulking four caulking pins 31. When the non-contact type liquid level sensor 20 is assembled, the couple of stators 24 are faced with the outer peripheral surface of a sintered magnet 23, and surrounds a side wall of the magnet over a range of 180° (see FIG. 1).

Examples of the magnetic materials for the stators 24 are silicon steel, iron, and martensitic stainless steel. Fixing member for fixing the stators 24 to the terminal 26B may any member if it is capable of firmly fixing of them.

A magnetoelectric transducing element 25, such as a hall element or a hall IC, is placed in the gap between the end faces of the couple of stators 24 so as to be put between the stators. Lead wires 25a of the magnetoelectric transducing element 25 are electrically connected to the terminals 26B and 26C by spot welding.

Lead wires 28a of the resistor 28 are electrically connected to the terminals 26A and 26B by spot welding. Also, Lead wires 29a of the capacitor 29 are electrically connected to the terminals 26B and 26C by spot welding. The terminals 26A, 26B and 26C, the magnetoelectric transducing element 25, the resistor 28 and the capacitor 29 are combined to form an electric circuit. The reason why the magnetoelectric transducing element 25, the resistor 28, the lead wires 25a, 28a and 29a are spot welded to the terminals 26A, 26B and 26C is that the spot welding more firmly connects them than the soldering, and environmental load materials, such as solder, flux, and solder cleaner are not used, viz., environmental issues are taken into consideration.

In the terminal assembly 30 assembled as described above, as shown in FIGS. 1, 2 and 4, sealing parts 26e inclusive of the V-grooves 26f of the terminals 26A, 26B and 26C are coated with seal coating material 18, and then are insert molded using synthetic resin, e.g., polyacetal resin, whereby the housing 21 is formed. As a result, most of the terminal assembly 30 except the outer connection parts 26g is embedded in the housing 21.

By the insert molding, the terminals 26A, 26B and 26C, the magnetoelectric transducing element 25, the resistor 28, the capacitor 29 and the couple of stators 24 are more reliably fixed by the synthetic resin forming the housing 21, so that relative displacements of them never occur.

The terminal assembly 30 except the outer connection parts 26g is embedded in the synthetic resin. The sealing parts 26e near the outer connection parts 26g as the only parts connecting to exterior are coated with the seal coating material 18, and are sealed against the housing 21. Accordingly, the terminal assembly 30 is completely isolated from exterior to prevent liquid leakage or the like and to protect the circuit against fuel and the like.

Figure 5A:
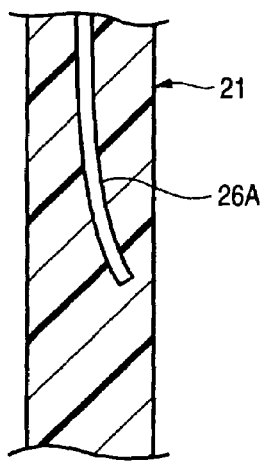
FIGS. 5A, 5B and 5C are a longitudinal sectional views for explaining how movable pins hold a terminal and prevents a deformation of the terminal in insert molding the terminal assembly.

The terminal assembly 30 must be insert molded in a state that only the strip like carrier 26d is held with a molding die (not shown) in order to embed other parts of the terminal assembly than the outer connection parts 26g in the housing 21. As shown in FIG. 5A, the tip ends of the terminals 26A, 26B and 26C are free ends. Accordingly, there is a possibility that those are deformed by an ejection pressure of the synthetic resin. The deformation of the tip ends damages the electronic parts (the resistor 28 and the capacitor 29) fixed to the terminals 26A, 26B and 26C and causes the couple of stators 24 to shift from the sintered magnet 23. This possibly results in degradation of a detection precision of the sensor.

Figure 5B:
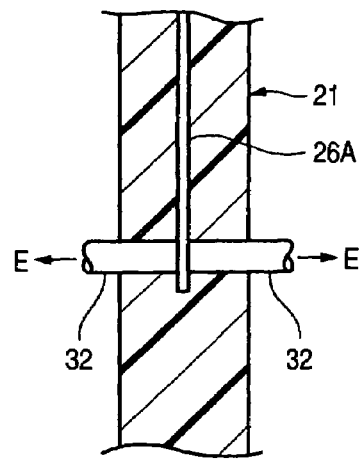
Figure 5C:
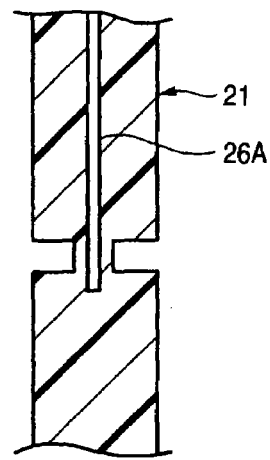

To prevent the above situation, as shown in FIG. 5B, movable pins 32 are provided on a molding die. The movable pins 32 hold both side surfaces of the terminals 26A, 26B and 26C at positions as indicated by shaded portions 33 in FIG. 1. In this state, synthetic resin is poured into the molding die under pressure. During the molding cycle of synthetic resin, the movable pins 32 are moved back in an direction of an arrow E, and finally the portions of the terminals held with the movable pins 32 are also embedded in the synthetic resin (FIGS. 5C). In this way, the deformation of the terminals 26A, 26B and 26C is prevented desirably.

Figure 4:
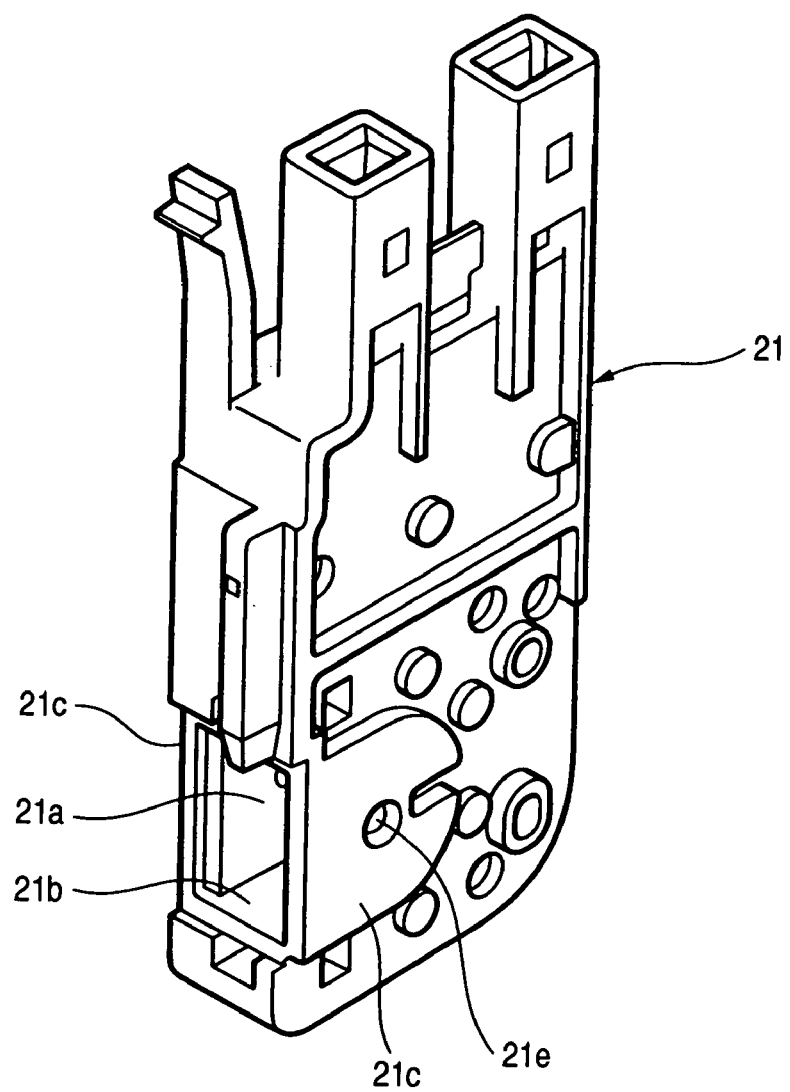
FIG. 4 is a perspective view showing a housing in FIG. 1.

As shown in FIGS. 1 and 4, a semicircular, magnet containing portion 21a including an opening port 21b formed in its side part is disposed while being confronted with an inner peripheral surface of the couple of stators 24. Through holes 21d and 21e are respectively formed in both side walls 21c of the magnet containing portion 21a, while being axially aligned with each other. The two through holes 21d and 21e are formed concurrently. Accordingly, those holes are accurately formed.

Figure 6:
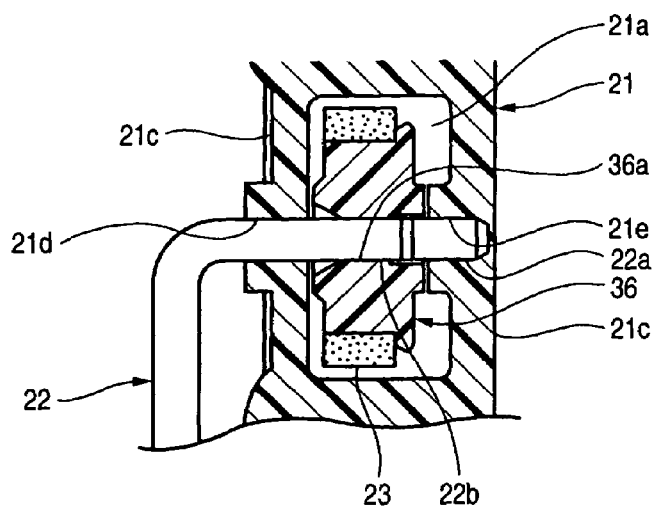
FIG. 6 is a longitudinal sectional view showing a state that a float arm is press fit into a rotary shaft disposed in a magnet containing portion in FIG. 1.

As shown in FIG. 6, a rotary shaft 36 supported by a float arm 22 is rotatably disposed in the magnet containing portion 21a. The sintered magnet 23, shaped like a ring, is fit to an outer peripheral surface of the rotary shaft 36. The sintered magnet 23 is formed with, for example, a ferrite magnet, and is formed in a manner that magnetic particles are molded into an annular shape and sintered, and then magnetized to have two poles. The thus formed sintered magnet is press fit into the rotary shaft 36 and firmly fixed thereto by bonding, for example.

The float arm 22 is fixed at one end to a float (not shown). A diameter of a tip of the other end of the float arm is smaller than that of a center hole 36a of the rotary shaft 36. After the rotary shaft 36 is inserted into the magnet containing portion 21a through the opening port 21b, the other end of the float arm 22 is inserted into one through hole 21d and the center hole 36a of the rotary shaft 36, and the small-diameter tip 22a of the float arm is inserted into the other through hole 21e of the magnet containing portion 21a. At this time, a large-diameter part 22b of the float arm is press fit into the center hole 36a of the rotary shaft 36. As a result, the float arm 22 to which the rotary shaft 36 is fixed is rotatably supported by the through holes 21d and 21e.

Figure 7:
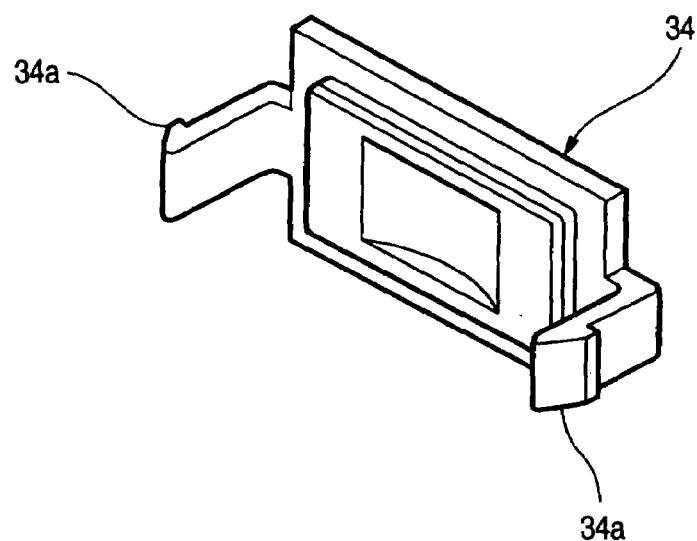
FIG. 7 is a perspective view showing a structure of a magnet containing portion cover.

As shown in FIGS. 1 and 7, a magnet containing portion cover 34 made of synthetic resin is applied to an opening port 21b of a magnet containing portion 21a to thereby cover the later. By engaging pawls 34a of the magnet containing portion cover 34 with engaging holes formed in the housing 21, the magnet containing portion cover 34 is assembled to the housing 21 to thereby prevent foreign matters from entering the magnet containing portion 21a.

Next, operations of the liquid level sensor according to the first embodiment will be described. As shown in FIG. 1, the non-contact type liquid level sensor 20 is disposed in a liquid storing tank, such as a vehicle fuel tank. When a liquid level 30a of liquid, for example, gasoline, stored in the liquid storing tank is changed, a float (not shown) vertically moves with the liquid level change, and with the vertical movement of the float, the rotary shaft 36 is turned together with the sintered magnet 23. With the turn of the sintered magnet 23, a magnetic flux passing through the magnetoelectric transducing element 25 changes. The magnetoelectric transducing element 25 senses its change and converts it into an electric signal, which in tun is output through the terminals 26A, 26B and 26C to exterior.

The non-contact type liquid level sensor 20 disposed in the liquid storing tank is used in tough conditions, for example, the non-contact type liquid level sensor 20 is exposed to a swelling liquid, for example, gasoline, and it is subjected to great change of temperature and vibrations.

As shown in FIG. 2, the terminal assembly 30 insert molded into the housing 21 is entirely embedded in the synthetic resin, except the outer connection parts 26g. The sealing parts 26e of the outer connection parts 26g are coated with the seal coating material 18 and is sealed against the housing 21. With the configurations, there is no chance of generating sealing defects caused by a molding sink of synthetic resin, poor welding of the cover, and the like, unlike the related liquid level sensor which inevitably suffers from such disadvantages. And, the electric circuit is not directly influenced by the swelling caused by the gasoline or the like. Accordingly, the interior of the non-contact type liquid level sensor 20 is perfectly sealed, and the non-contact type liquid level sensor 20 is stably and accurately operated for a long term.

Further, in the first embodiment, the magnetoelectric transducing element 25, the electronic parts (resistor 28, capacitor 29), the couple of stators 24, the terminals 26A, 26B and 26C and others are fixedly embedded in the synthetic resin of the housing 21. With this configuration, even when the automobile runs and the non-contact type liquid level sensor 20 vibrates, the relative positions of the parts do not change. Accordingly, the non-contact type liquid level sensor reliably operates while being free from the vibration.

The couple of stators 24 and the magnetoelectric transducing element 25 are fixed to the same terminal 26B. Therefore, the relative positions of the couple of stators 24 and the magnetoelectric transducing element 25 never change even when the use environmental temperature changes and the housing 21 expands and shrinks, and vibration is applied to the non-contact type liquid level sensor 20. Accordingly, the output signal of the non-contact type liquid level sensor 20 does not change, whereby a high detection precision is maintained.

Next, the liquid level sensor according to a second embodiment of the invention will be described with reference to FIGS. 8 to 10. In the second embodiment, a float arm is different from that of the first embodiment.

Figure 8:
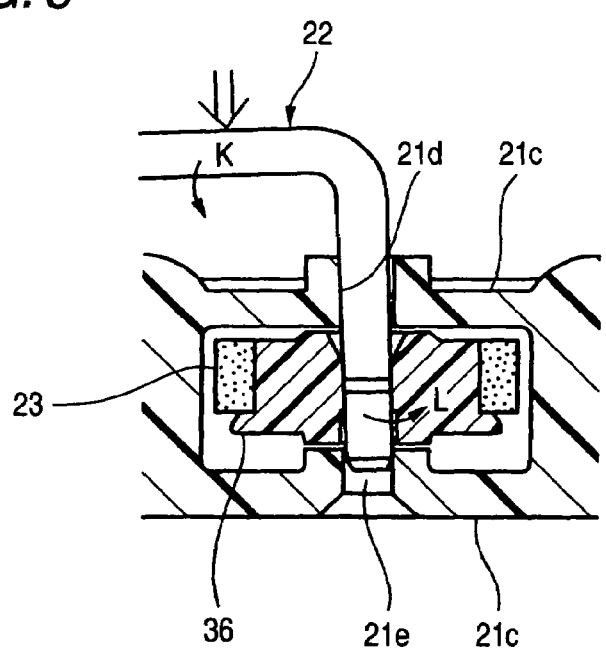
FIG. 8 is a longitudinal sectional view showing how a related float arm is press fit into the rotary shaft located in the magnet containing portion.

As shown in FIG. 8, the float arm 22 is press fit in a state that it is slanted in a direction of an arrow L when the float arm 22 is pressed in a direction of an arrow K for press-fitting the float arm 40 into the rotary shaft 36 since an end part of the related float arm 22 is bent at a right angle. The through holes 21d and 21e of the housing 21 are damaged during the press-fitting process of the float arm 22. Further, the float arm 22 is press slantly fit into the rotary shaft 36, and hence, the rotary shaft is inserted not smoothly. Furthermore, the relative position of the sintered magnet 23 to the magnetoelectric transducing element 25 is instable. This instability adversely affects an output signal of the magnetoelectric transducing element 25, sometimes.

Figure 9:
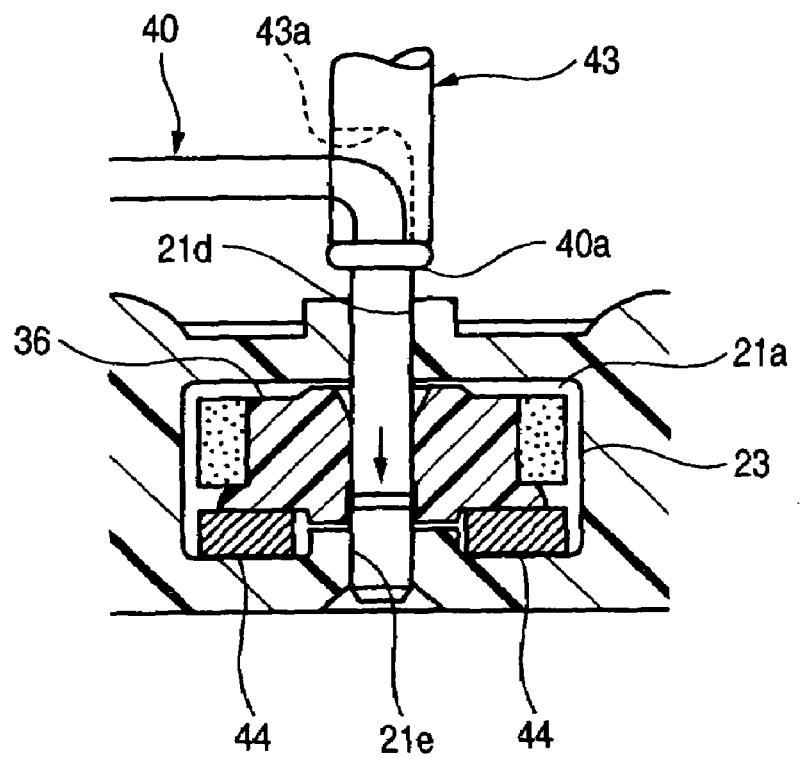
FIG. 9 is a longitudinal sectional view showing how the float arm is press fit into the rotary shaft located in the magnet containing portion by use of a press-fitting device.

A float arm 40 of the second embodiment is different from the related float arm in that a collar 40a is formed at a position of the float arm near its bent part, as shown in FIG. 9. A press-fitting device 41 is used for press fitting the float arm 40 into the rotary shaft 36.

Figure 10:
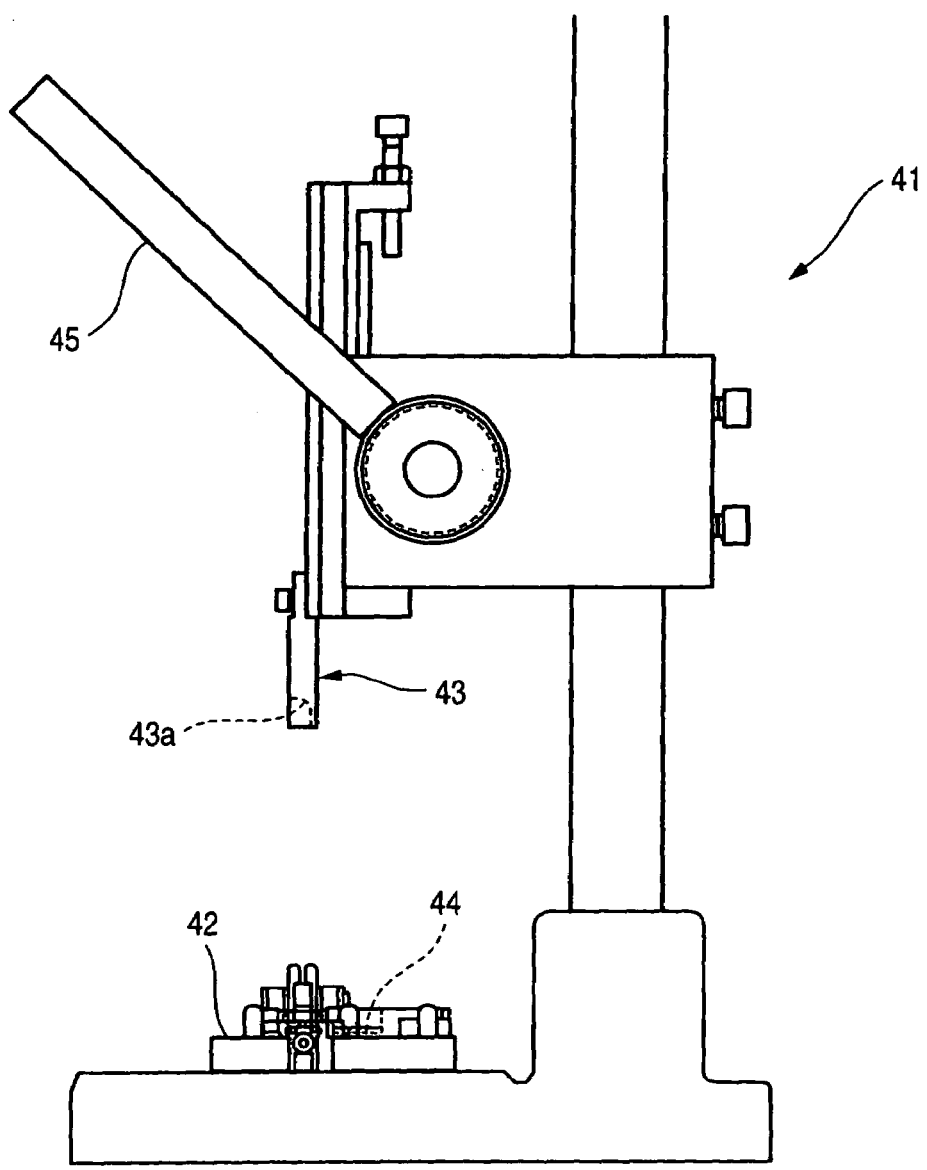
FIG. 10 is a side view showing a press-fitting device for press fitting the float arm into the rotary shaft.

As shown in FIG. 10, the press-fitting device 41 includes a fixing jig 42 for fixedly setting the housing 21 at a predetermined location, and a press-fitting bar 43. The fixing jig 42 includes a receiving jig 44 which is slidable in a horizontal direction. The receiving jig supports a lower end surface of the rotary shaft 36 located within the magnet containing portion 21a (see FIG. 9). When an operation lever 45 is operated, the press-fitting bar 43 is vertically (in FIG. 10) moved by an action of a rack/pinion mechanism (not shown). A groove 43a is formed in a tip end part of the press-fitting bar 43. The groove receives the bent part of the float arm 40.

To press fit the float arm 40 into the rotary shaft 36, the housing 21 is positioned at a predetermined location of the fixing jig 42, and the rotary shaft 36 is inserted into the magnet containing portion 21a. The receiving jig 44 is slidably moved to support the lower end surface of the rotary shaft 36, and then the press-fitting bar 43 is made to descend by operating the operation lever 45. The bent part of the float arm 40 is placed in the groove 43a, and the tip end of the press-fitting bar 43 abuts on the collar 40a of the float arm 40, and presses straight the float arm 40 in the axial direction. With provision of the collar, the float arm 40 is not slanted, and it is press fit into the rotary shaft 36 with a high precision, and a smooth rotation of the rotary shaft 36 is ensured.

The remaining portions of the second embodiment is substantially the same as the corresponding ones in the non-contact type liquid level sensor 20 in the first embodiment shown in FIGS. 1 through 7. Therefore, simplified or no description will be given on them, with like reference numerals assigned to like and equivalent portions.

Figure 11:
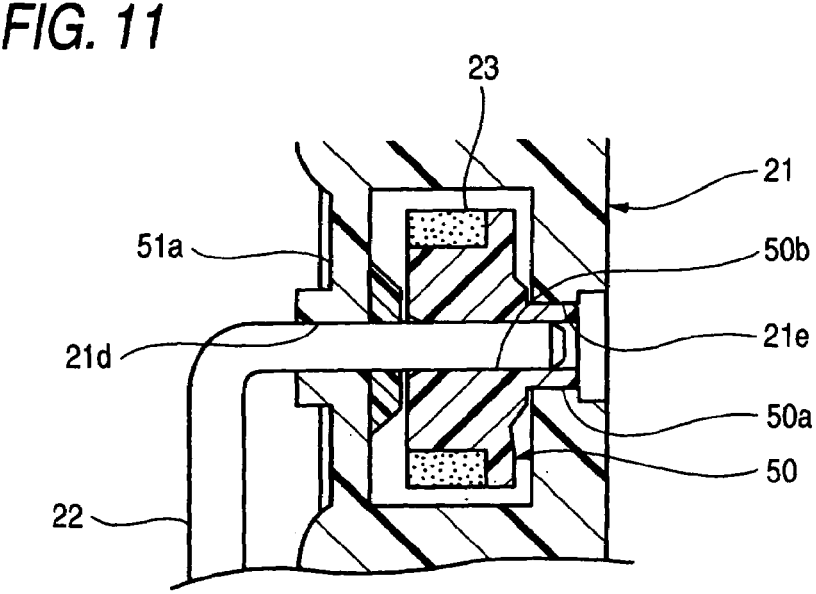
FIG. 11 is a longitudinal sectional view showing the rotary shaft which is rotatably disposed in the magnet containing portion in a state that it is supported by the float arm.

Next, a liquid level sensor according to a third embodiment will be described with reference to FIGS. 11 to 13.

The third embodiment is featured in that a rotary shaft 50 and a magnet containing portion cover 51 are different in shape from those in the first embodiment shown in FIGS. 1 through 7. As shown in FIG. 11, the rotary shaft 50 of the third embodiment consists of a cylindrical member with a sintered magnet 23 fit onto the center of the outer peripheral surface thereof. A through hole 50b passes through an axial center of the rotary shaft, and a shaft part 50a protrudes from one side of the rotary shaft. The shaft part 50a is fit into one through hole 21e of the housing 21 in a rotatable state. The float arm 22 which has passed through the through hole 21d of the housing 21 is press fit into the through hole 50b of the rotary shaft 50. With this structure, the rotary shaft 50 is rotatably supported in the magnet containing portion 21a by the float arm 22 having passed through the shaft part 50a and the through hole 21d of the housing 21.

Figure 12:
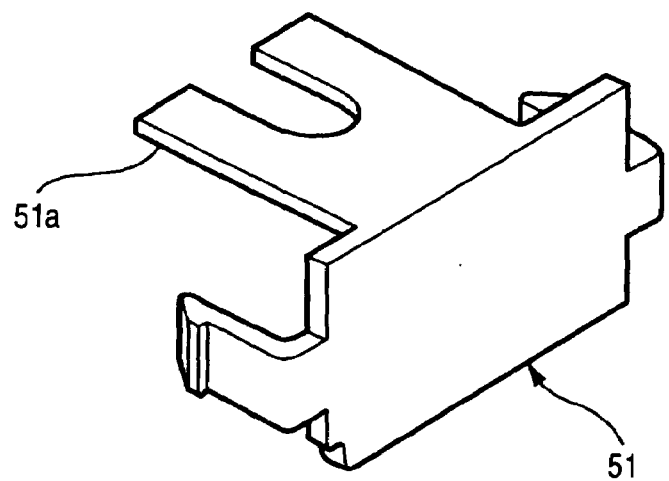
FIG. 12 is a perspective view showing a magnet containing portion cover.

As shown in FIG. 12, the magnet containing portion cover 51 has such a configuration that the magnet containing portion cover 34 shown in FIG. 7 includes a bifurcated extension 51a protruding to the side.

Figure 13A:
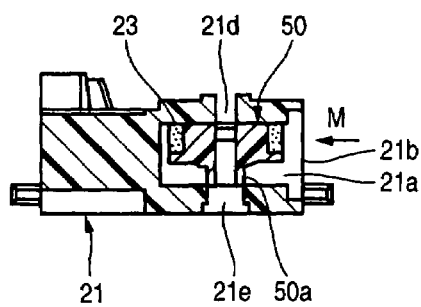
FIGS. 13A, 13B, 13C and 13D are longitudinal sectional views showing a procedure for assembling the rotary shaft into the magnet containing portion.
Figure 13B:
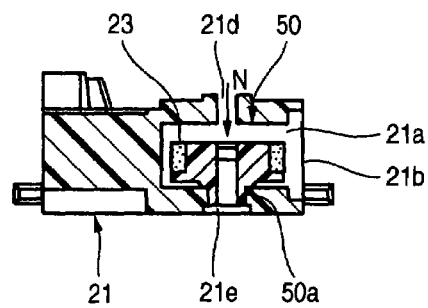
Figure 13C:
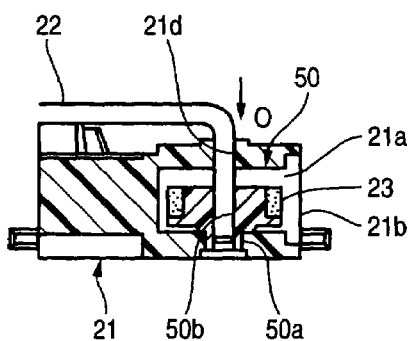
Figure 13D:
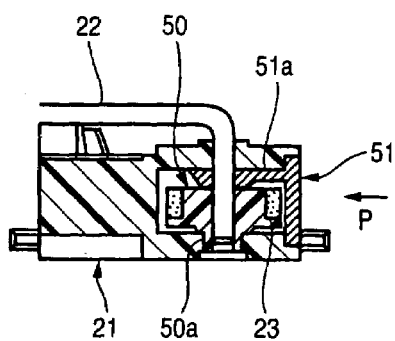
Figure 14:
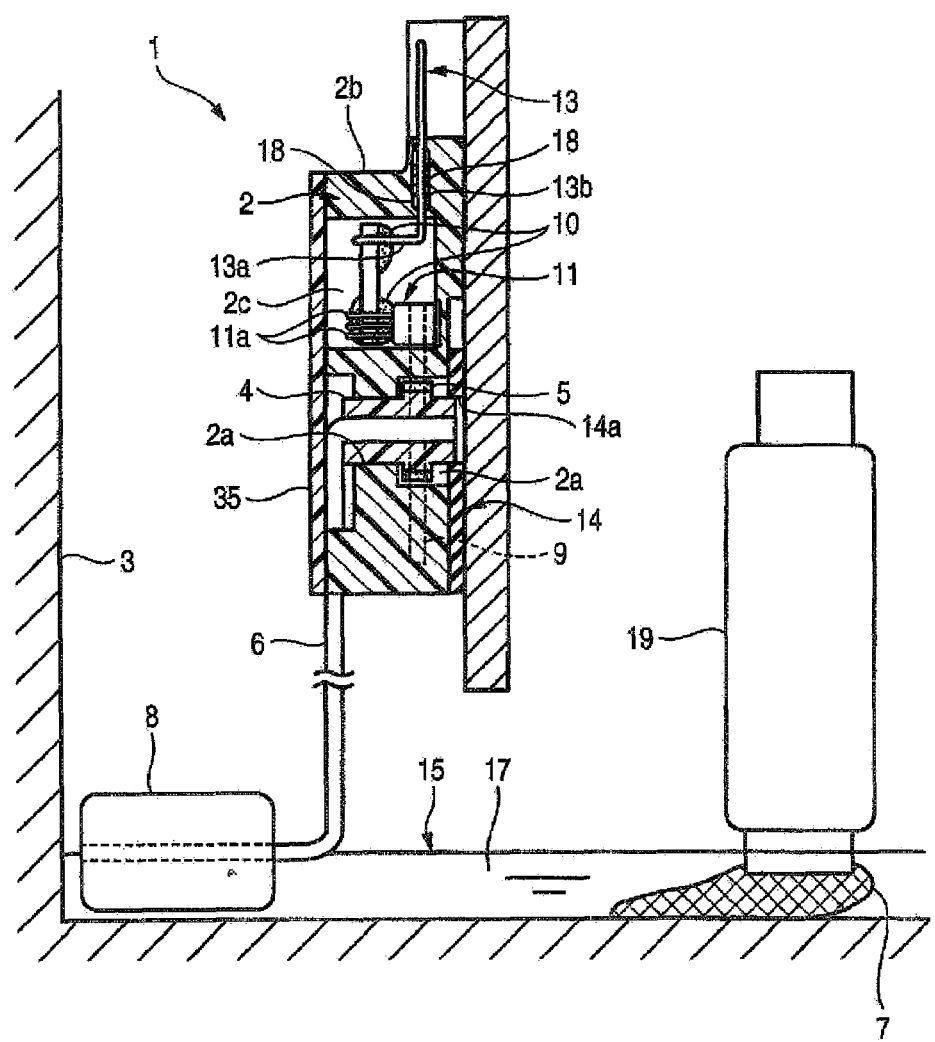
FIG. 14 is a longitudinal sectional view showing a related non-contact type liquid level sensor disposed in a fuel tank.
Figure 15A:
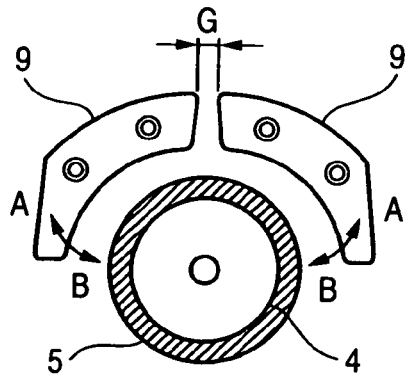
FIGS. 15A, 15B and 15C are plan views showing how a couple of stators displace when use environmental temperature varies in the non-contact type liquid level sensor shown in FIG. 14.
Figure 15B:
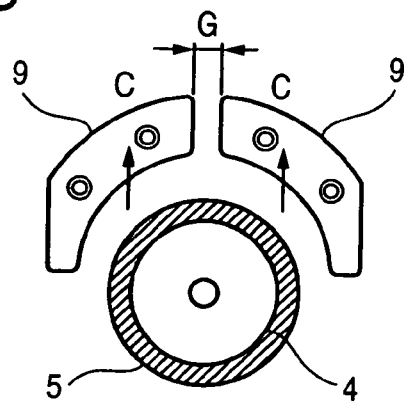
Figure 15C:
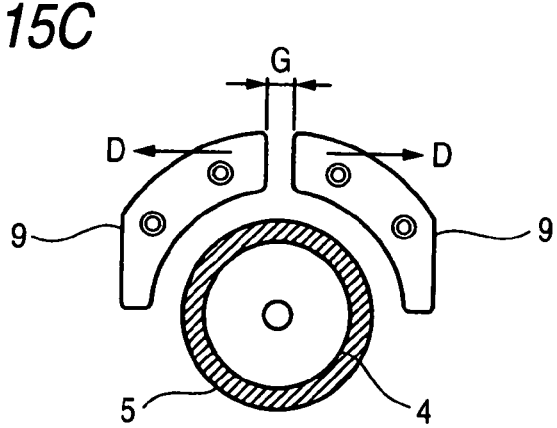

A procedure of assembling the rotary shaft 50 into the magnet containing portion 21a will be described with reference to FIGS. 13A, 13B, 13C and 13D. The rotary shaft 50 is inserted into the magnet containing portion 21a through the opening port 21b of the magnet containing portion 21a (FIG. 13A). Then, the rotary shaft 50 is moved in a direction of an arrow N, and the shaft part 50a is fit into the through hole 21e of the housing 21 (FIG. 13B). Subsequently, one end of the float arm 22 is inserted into the through hole 21d of the housing 21 in a direction of an arrow O, and press fit into the through hole 50b of the rotary shaft 50 by an amount of a predetermined length. Finally, the bifurcated extension 51a is inserted to between the inner side wall of the magnet containing portion 21a and the rotary shaft 50, and the magnet containing portion cover 51 is mounted on the housing 21 to close the opening port 21b of the magnet containing portion 21a.

In the third embodiment, an axially extending clearance of the rotary shaft 50 is adjusted by adjusting a thickness of the bifurcated extension 51a. And, a detection precision of the liquid level sensor is improved since the rotary shaft 50 (sintered magnet 23) is stable. Further, a press-fitting length of the float arm 22 is increased. A slant of the float arm 22 is prevented, and the float arm 22 is firmly fixed to the rotary shaft 50. The mounting of the magnet containing portion cover 51 prevents foreign matters from entering the magnet containing portion 21a.

The remaining portions of the third embodiment is substantially the same as the corresponding ones in the non-contact type liquid level sensor 20 in the first embodiment shown in FIGS. 1 through 7. Therefore, simplified or no description will be given on them, with like reference numerals assigned to like and equivalent portions.

Also, a manufacturing method of the non-contact type liquid level sensor is as follows. A housing 21, a rotary shaft 36 rotatably provided in a magnet containing portion 21a formed in the housing 21, a magnet 23 being fixed to an outer peripheral surface of the rotary shaft 36 and rotating together with the rotary shaft 36, a couple of stators 24 being disposed facing an outer peripheral surface of the magnet 23, and an electric circuit including at least a magnetoelectric transducing element 25 for detecting a change of magnetic flux in the stators 24 caused by rotation of the magnet 23 and a set of terminals 26A, 26B and 26C are provided. The magnetoelectric transducing element 25 and electronic parts 28 and 29 are electrically connected and fixed to predetermined positions of the set of terminals 26A, 26B and 26C. A terminal assembly 30 is assembled by fixing the couple of stators 24 to predetermined positions of the terminals 26A, 26B and 26C. The terminal assembly 30 is insert molded into the housing 21 to embed the terminal assembly except outer connection parts 26g of the terminals 26A, 26B and 26C in the housing 21. Therefore, the magnet 23 is rotatably disposed within the magnet containing portion 21a.

The present invention is not limited to the above-mentioned embodiment and modifications, but may variously be modified, altered and changed within the scope of the present invention. It should be understood that materials, shapes, dimensions, numerical values, forms, the numbers, parts and components installing locations and others in the embodiment and modifications mentioned above may be changed and modified within a scope within which the present invention holds.

It is evident that the non-contact type liquid level sensor may be applied not only to the detection of a liquid level of gasoline in the vehicle fuel tank as in the case mentioned above, but also the detection of a liquid level in a tank for storing any of various kinds of liquids.

What is claimed is:

1. A liquid level sensor comprising:
   a housing;
   a rotary shaft, rotatably provided in the housing;
   a magnet, fixed to the rotary shaft, and rotating together with the rotary shaft;
   a pair of stators, disposed so as to face an outer peripheral surface of the magnet; and
   an electronic circuit, including at least a set of terminals and a magnetoelectric transducing element for detecting a change of magnetic flux in the stators caused by rotation of the magnet and for outputting an electric signal,
   wherein the magnetoelectric transducing element and the stators are electrically connected to the set of terminals, and the magnetoelectric transducing element and the stators are provided on the set of terminals so that a terminal assembly is formed; and
   wherein the housing is formed by insert molding the terminal assembly with resin so that the terminal assembly, including the set of terminals and the transducing element, is embedded in the housing.

2. The liquid sensor as set forth in claim 1, wherein the magnet is contained in a magnet containing portion formed in the housing.

3. The liquid sensor as set forth in claim 1, wherein the pair of stators and the magnetoelectric transducing element are fixed to one terminal of the set of terminals.

4. The liquid sensor as set forth in claim 1, wherein a sealing part of the terminal assembly is coated with a sealing agent; and
   wherein the sealing part is located near a connection portion of the terminal assembly which is exposed to exterior, and the sealing part is embedded in the housing.

5. A method of manufacturing a liquid sensor, comprising the steps of:
   providing a rotary shaft;
   providing a magnet fixed to the rotary shaft, and rotating together with the rotary shaft;
   providing a pair of stators, disposed so as to face an outer peripheral surface of the magnet;
   providing an electronic circuit which includes at least a set of terminals and a magnetoelectric transducing element for detecting a change of magnetic flux in the stators caused by rotation of the magnet;
   electrically connecting the magnetoelectric transducing element and the stators to the set of terminals and providing the magnetoelectric transducing element and the stators on the set of terminals so that a terminal assembly is formed; and
   forming a housing in which the terminal assembly including the set of terminals and transducing element is embedded by insert molding with resin.

6. The method as set forth in claim 5, wherein the magnet is contained in a magnet containing portion formed in the housing.

7. The method as set forth in claim 5, further comprising the step of coating a sealing part of the terminal assembly with a sealing agent before the forming step.

* * * * *